United States Patent [19]

Bishop

[11] 4,027,159

[45] May 31, 1977

[54] COMBINED USE OF VISIBLE AND NEAR-IR IMAGING SYSTEMS WITH FAR-IR DETECTOR SYSTEM

[75] Inventor: Stephen G. Bishop, Arlington, Va.

[73] Assignee: The United States of America as represented by the Secretary of the Navy, Washington, D.C.

[22] Filed: Oct. 20, 1971

[21] Appl. No.: 191,132

[52] U.S. Cl. ............................... 250/338; 250/342; 340/228 S
[51] Int. Cl.² ........................................... G01J 1/00
[58] Field of Search ............. 250/83.3 H, 83.3 HP, 250/221, 338, 339, 330, 332, 333, 342; 340/228 S, 258 B

[56] References Cited

UNITED STATES PATENTS

| 2,976,419 | 3/1961 | Menke et al. ...... 250/330 X;83.3 H |
| 2,994,053 | 7/1961 | DeWaard ..................... 250/83.3 H |
| 3,076,961 | 2/1963 | Bibbero .................... 250/83.3 H X |
| 3,254,219 | 5/1966 | Finlay et al. ................... 250/338 X |
| 3,277,303 | 10/1966 | Jensen et al. ............. 250/83.3 H X |
| 3,493,953 | 2/1970 | Taylor ........................... 250/330 X |
| 3,614,439 | 10/1971 | Beelik, Jr. et al. ................ 250/332 |
| 3,631,434 | 12/1971 | Schwartz ....................... 340/228 S |
| 3,641,348 | 2/1972 | Schwarz ................... 250/83.3 H X |
| 3,665,440 | 5/1972 | McMenamin ................. 250/338 X |

FOREIGN PATENTS OR APPLICATIONS 945,329  12/1963  United Kingdom .......... 250/83.3 H

*Primary Examiner*—Peter A. Nelson
*Attorney, Agent, or Firm*—R. S. Sciascia; Philip Schneider

[57] ABSTRACT

A light-weight, night vision system which combines a reflected-light, imaging device with an audio-monitored, far infrared detection device (HANSAM) for detecting long wavelength infrared radiation from warm bodies. The imaging device may be a near-infrared image converter or a visible image intensifier such as a "starlight scope". The Hansam is attached to the imager so that the center of its field of view coincides with the center of the field of view of the imager.

8 Claims, 2 Drawing Figures

COMBINED USE OF VISIBLE AND NEAR-IR IMAGING SYSTEMS WITH FAR-IR DETECTOR SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to the detection of warm bodies and especially to detection apparatus combining a imaging device with an audio-monitored, far-infrared detection device.

A need exists in warfare, especially in guerrilla warfare in jungle terrain, for apparatus which can detect the presence of camouflaged opponents or enemies obscured by foliage. The detection of enemy soliders is even more critical at night since this is when most guerrilla operations take place and since it is difficult to see soildiers at night even if they are not camouflaged or boscured by foliage.

Imaging devices are available for detection of humans under such conditions. There are scanning, far-infrared (far-IR) imagers; however these are expensive and are not easily portable because of their weight. There are visible light imagers, such as the so-called starlight scope, and near-IR imagers. These are light in weight and relatively inmexpensive. They depend on reflected natural background light or light from a near-IR searchlight. They provide an image of the surroundings but are not sensitive to the far-IR radiation emitted by objects near room temperature such as human bodies. Thus, they would not reveal a human being hidden in foliage, although they would detect him at night if he were in the open.

Another type of IR detection device is the so-called "Hansam", a single-channel, hand-scanned, audio-monitored far-IR detecting device. This is a passive device which detects heat (far-IR) emitted by a human body or other objects near room temperature. It is a small, light device which fits into a cylinder about the size of a searchlight and provides an audio, rather than a visual, signal. The operator of a Hansam may experience some difficulty when scanning the surroundings for warm objects in a night-time situation. Without an image to guide him, he may become disoriented and make scanning errors (miss large areas, aim too high, aim too low, etc.).

SUMMARY OF INVENTION

The invention comprises a hand-scanned, passive far-IR detecting device attached to either a visible-light or a near-IR imager, the two forming a unit. The attachment is made so that the centers of the fields of view substantially coincide for the range in whch the device is useful.

An object of the invention is to detect the far-IR radiation emitted by objects which are near room temperature, especially human beings.

Another object is to detect warm objects which are obscured from view by other non-heat-emitting objects. A further object is to provide a relatively inexpensive, light-weight, hand-held detecting device combining a visual imager and a far-IR passive detector.

Other objects, advantages and novel features of the invention will become apparent from the following detailed description of the invention when considered in conjunction with the accompanying drawings wherein:

DETAILED DESCRIPTION OF THE INVENTION

The hansam is a light-weight, low-cost system (Hansam) in which the far-IR radiation emitted by warm objects such as a human body is detected by a single IR detector cell, a chalcogenide glass bolometer, the output of which controls the frequency of an audio oscillator which the operator monitors via an earphone. Changes in the temperature of the field of view as the device is scanned across a warm body produce a change in the detector's to output which is perceived by the operator as a change in frequency or pitch of the audio monitoring output signal.

Figure 1:
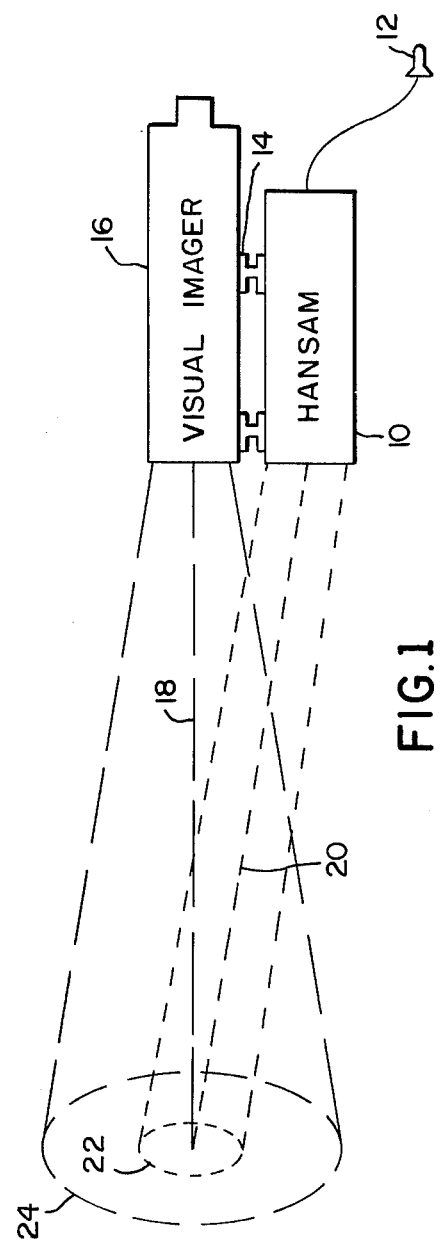
FIG. 1 shows an embodiment of the invention.
Figure 2:
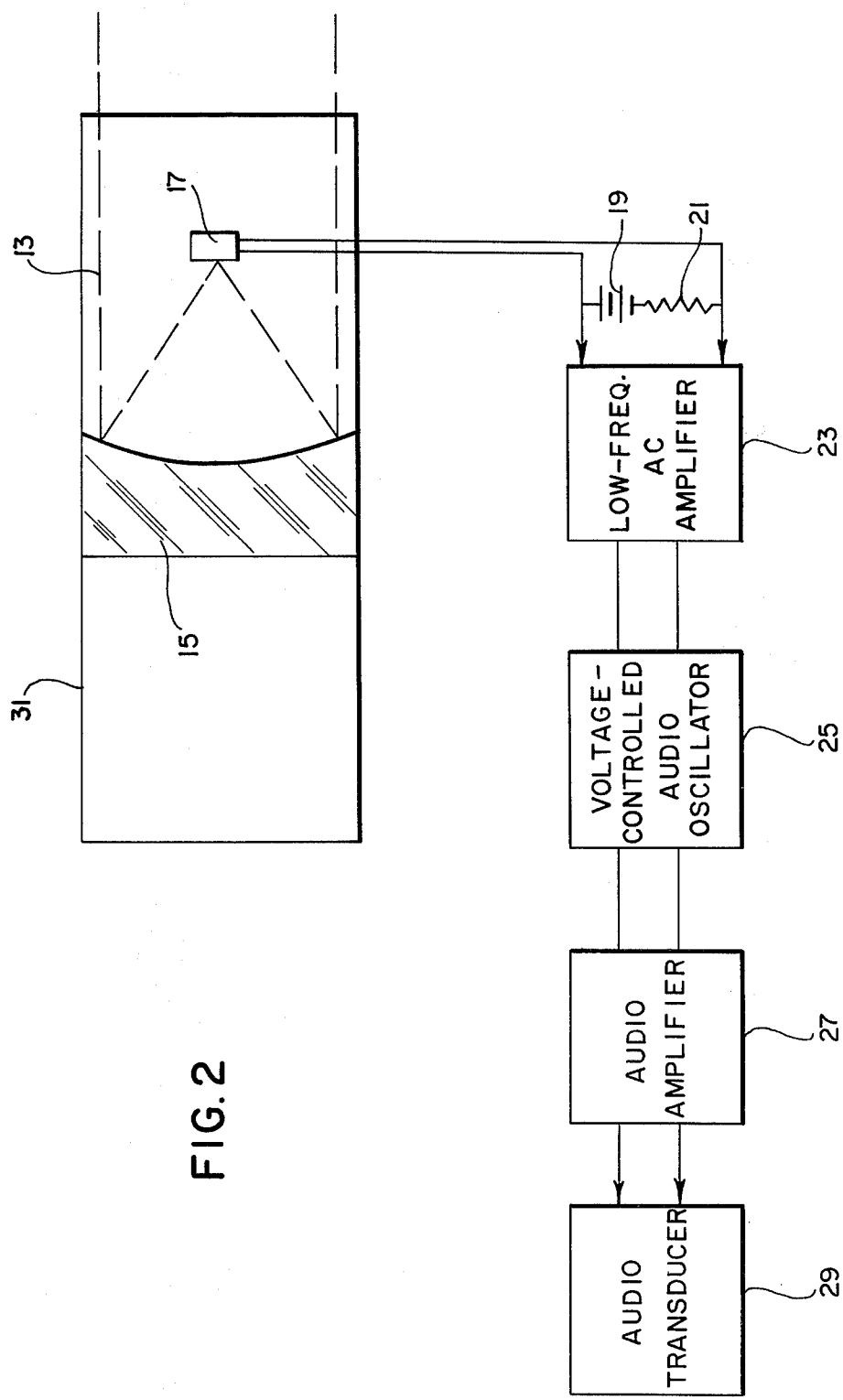
FIG. 2 is a block diagram of a Hansam device.

The embodiment of the invention shown in FIG. 2 conprises a mirror 15 having a concave front surface, a chalogenide glass bolometer detector 17 positioned at the focal point of the mirror 15, a d.c. source 19, a resistance 21, a low-frequency a.c. amplifier 23, a voltage-controlled audio oscillator 25, an audio amplifier 27 and an audio transducer 29, preferably an earphone. All components except the earphone are mounted within a tube 31, which may be the size of a flashlight. (Some components are shown outside the tube 31 in the drawing for the sake of clarity.)

Infrared radiation 13 shown by the dotted lines enters the tube 31, which is open at the front, and strikes the front surface of the mirror 15. The IR radiation is focused on the detector 17 which is sensitive to IR radiation, i.e., the bolometer resistance changes in accordance with the amount of IR radiation impinging upon it. Since the resistance of the bolometer detector is in series with the d.c. source 19 and the resistor 21, a voltage exists across it which changes as its resistance changes. This voltage is coupled into the input terminals of the low-frequency a.c. amplifier 23, which may, for example, have a passband from 0.1 Hz to a few KHz.

Thus when the operator scans the tube over the region of interest, changes of temperature in the scanned region cause changes in the amount of IR radiation focused on the IR detector 17 which cause changes in the voltage output of the detecting means. These voltage changes are amplified and applied to the voltage-controlled audio oscillator 25, the output frequency of which depends on the amplitude of the voltage applied at its input terminals. The output of the oscillator 25 is amplified by an audio amplifier 27 and applied to the audio transducer 29, which may be an earphone fitting into the ear of the operator.

The operator is informed of a change in temperature (a temperature gradient) in the scanned area by a change in tone of the audio signal which he hears. When no temperature gradient exists, there is no change in the audible signal. It is apparent that the frequency heard is a function of the temperature gradient, i.e., the greater the temperature gradient, the higher the frequency. Alternatively, if the device is pointed in a fixed direction, a change in signal (audible frequency) occurs only if the temperature changes, as when an object or person moves into or out of the field of view.

The chalcogenide glass bolometer is sensitive to radiation in the far-IR region.

It should be observed that it is possible to use other means in place of the illustrated ones, for example, a lens system for focusing IR radiation on the detector and loud-speaker instead of an earphone.

The Hansam 10 with its output earphone 12 is attached by any convenient method such as bolt plates with rods between them (14) to a visual imaging device 16. The latter may be a near-IR imager or a visible-light imager such as the starlight scope. The near-IR imager usually incorporates an IR projector or searchlight.

The attachment is made in such a manner that the center of the field of view of the visual imager 16 coincides with the center of the field of view of the Hansam at some predetermined convenient distance which depends on the range of the device. Actually this is not critical since the center lines 18 and 20 have a very small angle between them (although this is not apparent because of the incorrect dimensions of the figure) since they are mounted together and the distances to detected objects are much greater than the spacing between the center lines 18 and 20 at the detecting device end. The field of view 22 of the Hansam is much smaller than the field of view 24 of the imager.

The operator observes his surroundings through the eyepiece of the imager 16 while simultaneously monitoring the audio signal from the Hansam through the earphone. Hence the system simultaneously provides an image of the surroundings in intensified reflected visible light (or reflected near-IR radiation) and an audio monitor of the far-IR radiation emitted by any warm object in the exact center of the field of view of the imager.

Clearly, one operator using the two detecting systems as a coordinated, coaxially trained unit can acquire a more accurate representation of his surroundings with less effort and in less time than two operators using the imager and Hansam separately. Use of the combined unit also prevents the scanning errors which are bound to occur when Hansam and a visual imager are used separately.

As is obvious, the use herein of the HANSAM as a far-IR detecting device is exemplary only. Although the HANSAM is a preferred device, any far-IR, passive detecting device light enough in weight to be combined with a visual imager so that the combination can be hand-held may be used.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. The combination of a visual imaging device and a HANSAM as a simultaneously operated integral unit, the unit being formed so that the field of view of said Hansam lies at the center of the field of view of said imaging device, with a visual image formed by said visual imaging device, and an audio output signal produced by said HANSAM.

2. The combination of claim 1, wherein said two devices are separate devices which are attached to each other.

3. The combination of claim 1, wherein said visual imaging device is a device which detects reflected visible light.

4. The combination of claim 1, wherein said visual imaging device is a device which detects near-IR radiation.

5. A detecting device comprising the combination of:
   first detecting means for providing a visual image of the surroundings, said means having a field of view;
   second detecting means for passively detecting far-IR radiation emitted from objects having temperatures at or near room temperature, said second detecting means providing an audio output signal and having a field of view, said second detecting means having a chalcogenide-glass, IR detector element,
   said two detecting means being attached to each other so that the centers of their fields of view substantially concide within the effective range of the device, and
   said two detecting devices being simultaneously operated.

6. A device as in claim 5, wherein said first detecting means detects reflected visible light.

7. A device as in claim 5, wherein said first detecting means detects near-IR radiation.

8. The combination of a visual imaging device and a far-IR, passive detecting device, the combination being a hand-held, integral, simultaneously operated unit, the unit being formed so that the centers of the fields of view of the two devices substantially coincide within the effective range of the unit.

* * * * *